Feb. 11, 1969
C. KADLEC
3,426,586
AIRCRAFT WEIGHT MEASUREMENTS
Filed June 17, 1966
Sheet 1 of 4
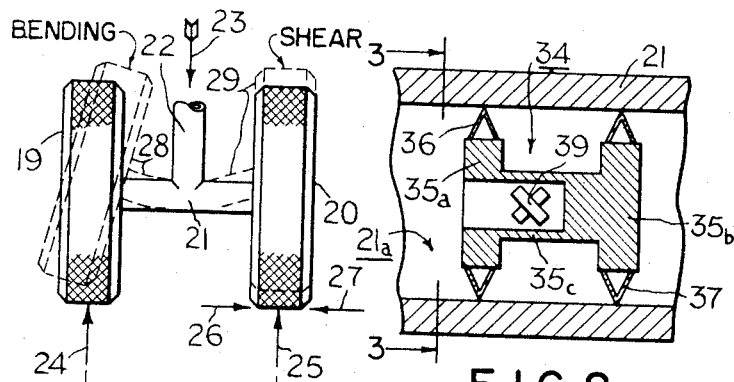
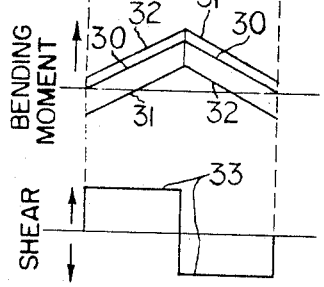
FIG. 1
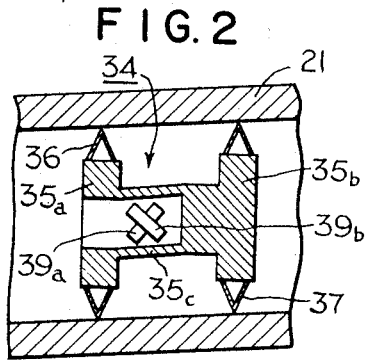
FIG. 2
FIG. 4
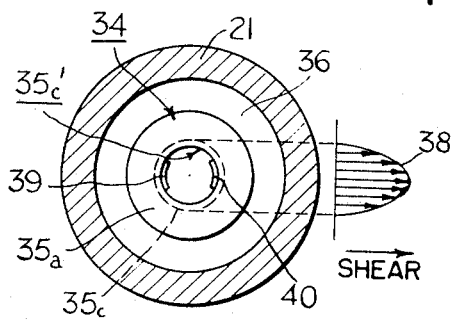
FIG. 3
FIG. 6
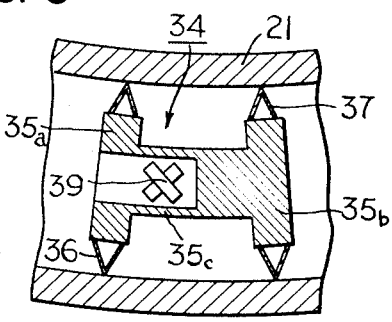
FIG. 7
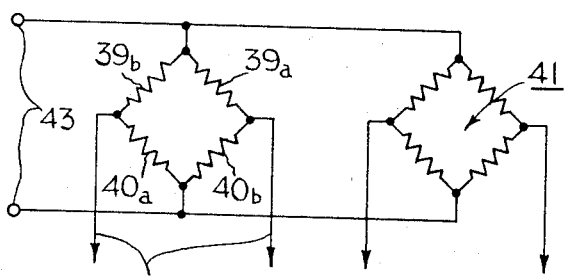
FIG. 5
INVENTOR.
CHARLES KADLEC
BY
Thomson & Mrose
ATTORNEYS INVENTOR.
CHARLES KADLEC
BY
Thomson & Mrose
ATTORNEYS Feb. 11, 1969 C. KADLEC 3,426,586
AIRCRAFT WEIGHT MEASUREMENTS
Filed June 17, 1966 Sheet 4 of 4

INVENTOR.
CHARLES KADLEC
BY
Thomson & Mrose
ATTORNEYS

United States Patent Office 3,426,586
Patented Feb. 11, 1969

3,426,586
AIRCRAFT WEIGHT MEASUREMENTS
Charles Kadlec, Acton, Mass., assignor to BLH Electronics, Inc., Waltham, Mass., a corporation of Delaware
Filed June 17, 1966, Ser. No. 558,514
U.S. Cl. 73—88.5
Int. Cl. G01n 5/00
30 Claims

ABSTRACT OF THE DISCLOSURE

Weight supported by a wheeled vehicle such as an aircraft, is detected inside hollow axles by strain-gage transducers which are locked in place by expansible collets formed by flexible washers making substantially line-contact connections with interior axle surfaces; the collets for each transducer are carried by rigid end portions of a sensing element between which is a deformable tubular portion equipped internally with strain gages arranged to characterize shear effects caused by the weight.

---

The present invention relates to improvements in the measurement of loadings such as those which are effective at the wheels of aircraft and the like, and, in one particular aspect, to novel and improved aircraft weighing transducers which simply and uniquely cooperate with axle structures to develop strain gage outputs precisely related to vertical forces and isolated from undesirable bending-moment effects.

As has long been well known, measurements of aircraft weights at distributed sites such as those of the usual landing gear provide data from which total weight and locus of the center of gravity may readily be calculated as important aids to safe and efficient aircraft operation. Although accessory weighing jacks and platform-type scales are capable of determining these weights accurately, it offers obvious advantage to intergrate the weighing instrumentalities "on-board" where they may be used at any ground location at any time without involving outside equipment and personnel. Accordingly, for the latter purposes, it has been proposed that the sensing techniques might include mounting potentiometer-type detectors or strain gages directly on the wheel struts or in association with deformable members responsive to pressures in the hydraulic wheel suspensions. As a practical matter, such techniques are found to be wanting in that they have not succeeded in avoiding serious errors due to responses to forces other than those representing merely the craft weight; in hydraulic or pneumatic systems, for example, there are highly disturbing effects of friction between relatively movable parts, and in the strut-gaging systems the measurements unavoidably reflect unwanted responses to side loadings due to such factors as wind, apron discontinuities or slopes, and uneven tire wears or inflations. The allowable margin of error in calculations of aircraft center of gravity is very small, because of the great hazards which can result from faulty information as to its whereabouts in what is invariably a very limited permissible range to begin with on any craft.

In accordance with certain aspects of the recognitions and teachings of the present invention, however, on-board transducers of a strain-gage type may be caused to respond with extraordinary precision to loading forces which produce shear in wheel axles of aircraft landing gear, with the result that their responses accurately characterize true weight reactions which are essentially isolated from the usual error-inducing effects differently evidencing themselves as bending. Isolation of shear is uniquely achieved by mounting a gaged shear-responsive element upon a wheel axle by way of spaced adjustable collets which are in line contact with the axle, and outputs are optimized through use of a hollow cylindrical transducer shear-sensing member and through use of self-adjusting locking units which eliminate inadvertent loadings of the transducer while it is assembled into integrated relationship with the aircraft.

It is one of the objects of the present invention, therefore, to provide novel and improved transducer apparatus of uncomplicated construction for the precision isolated measurement of vehicle loading in one direction only.

Another object is to provide unique strain-gage transducers having improved collet mounts which reliably maintain predetermined orientations relative to supporting structures under extreme environmental use conditions.

A further object is to provide new and advantageous shear-responsive strain-gage sensors of economical and simple tubular form which develop high-level outputs.

An additional object is to provide shear-responsive strain-gage transducers which readily lend themselves to secure stress-free assembly with vehicle axles for precise measurement of wheel reactions in the vertical direction independently of side loadings and bending moment effects.

Still further it is an object to provide unique onboard aircraft weight transducers which may be quickly and reliably mounted within tubular wheel axles in relatively non-critical locations by way of expansible line-contacting collet units and which involve shear-responsive strain-gage sensors which advantageously effect cancellations of unwanted bending-moment reactions.

By way of a summary account of practice of this invention in one of its aspects, the weight supported by each wheel of an aircraft is detected by a strain-gage transducer mounted within the usual hollow axle associated therewith, the sensing element for the transducer being in the form of a relatively flexible tubular member having relatively rigid portions at its ends. One of the rigid end portions is surrounded by a radially-expansible annular collet including back-to-back flexible dished washer elements which together produce a thin outer peripheral edge normally of slightly smaller diameter than the interior of the axle, the inner peripheral edges being axially spaced. A similar collet is associated with a separable support for the other rigid end portion of the sensing element, and both collets are radially expansible by axial compression via adjusting nuts, whereby they make secure and essentially line-contact connections with the interior of the axle while also providing needed stable and rigid internal suspensions for the ends of the sensing element. The separable colleted support further includes an interleaved array of annular washers which are of different dimensions permitting them to be radially displaced for purposes of locking the support in a desired radial relation to the other rigid portion of the sensing element when the washers are clamped axially. Strain gages bonded to the tubular member at diametrically-opposite positions respond to both bending and shear effects, but are either so located that each gage is non-responsive to bending or are connected in a bridge relationship which cancels responses due to bending and causes the outputs to be related to shear alone. The latter outputs are in turn accurately related to the wheel reactions due to craft weight, without including error-inducing components resulting from side loadings.

Although the aspects and features of this invention which are believed to be novel are expressed in the appended claims, additional details as to preferred practices and embodiments, and as to the further advantages, objects and features thereof, may be most readily comprehended through reference to the following description taken in connection with the accompanying drawings, wherein:

FIGURE 1 illustrates an aircraft landing gear assembly in which dashed linework characterizes bending and shear deflections, together with related bending moment and shear diagrams;

FIGURE 2 is a cross-section of an axle-mounted shear transducer in a neutral or undeflected condition;

FIGURE 3 is a cross-section taken along section line 3—3 in FIGURE 2;

FIGURE 4 represents an inner cylindrical surface of the transducer of FIGURES 2 and 3 together with strain gages carried thereon;

Figure 8:
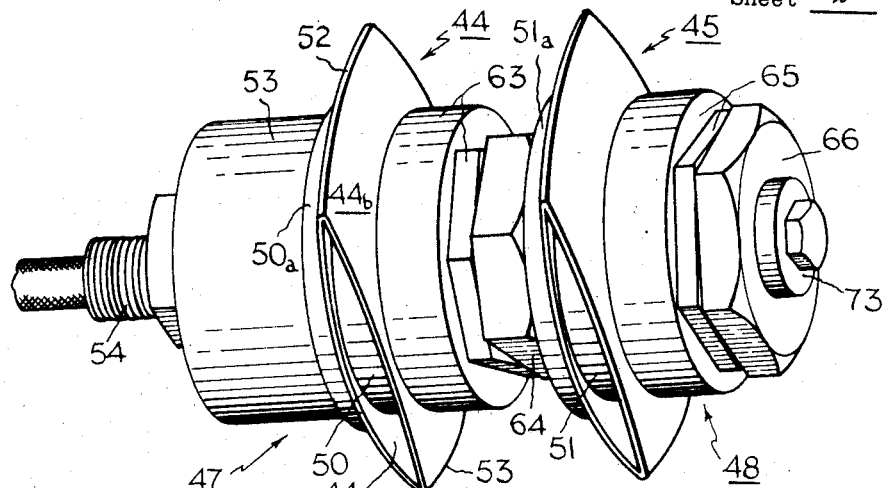
Figures 11, 12:
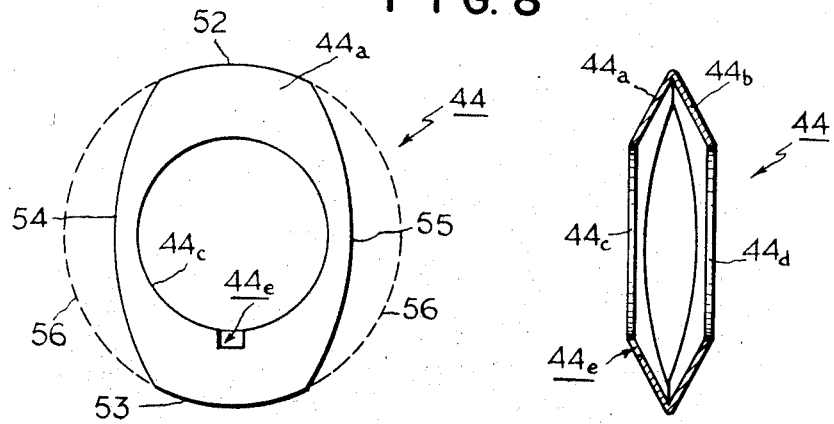
Figure 13:
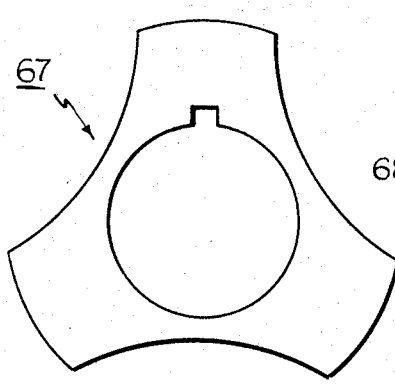
Figure 14:
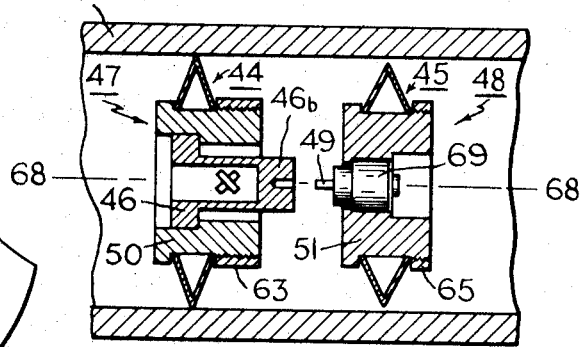
Figure 9:
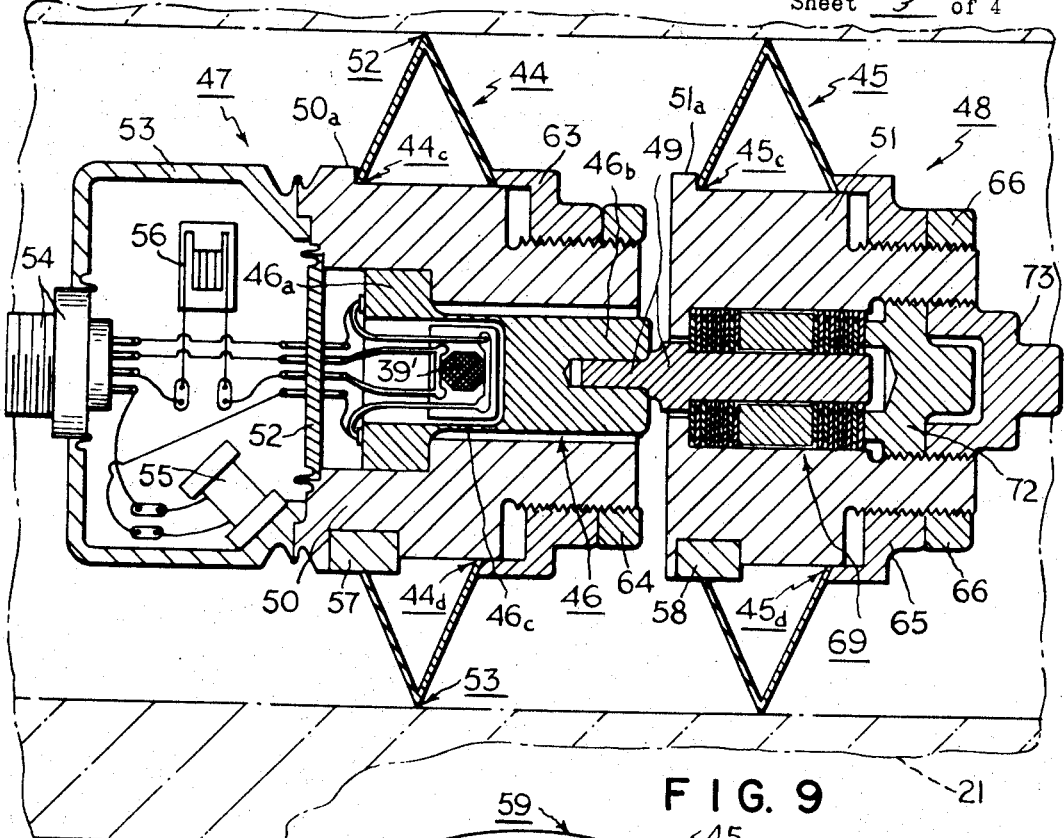
Figure 10:
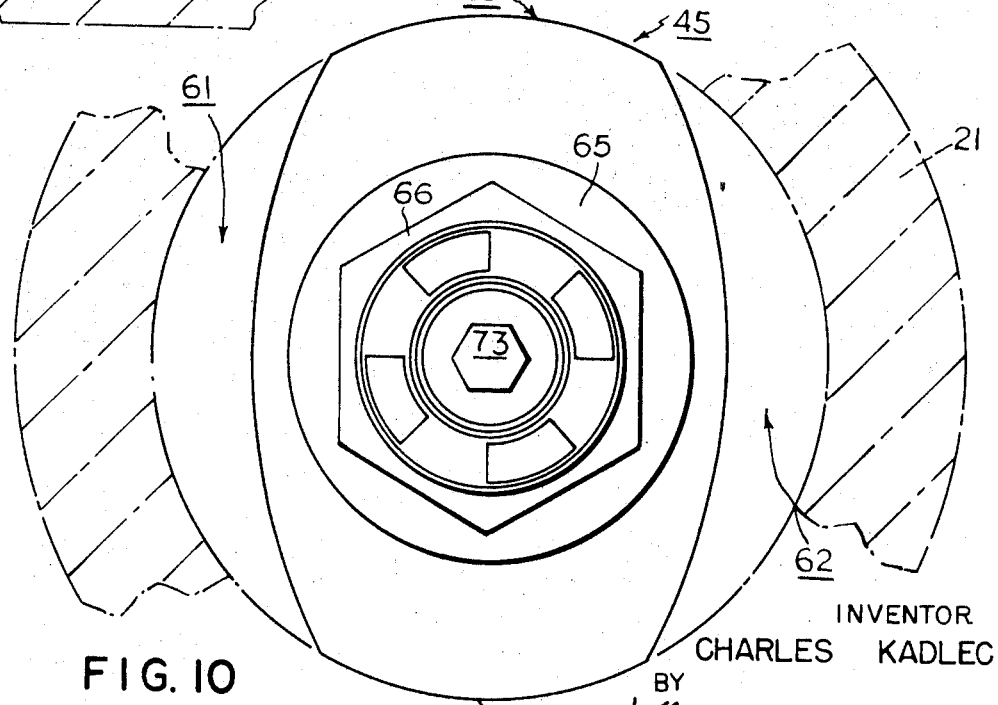
Figures 15, 16, 17:
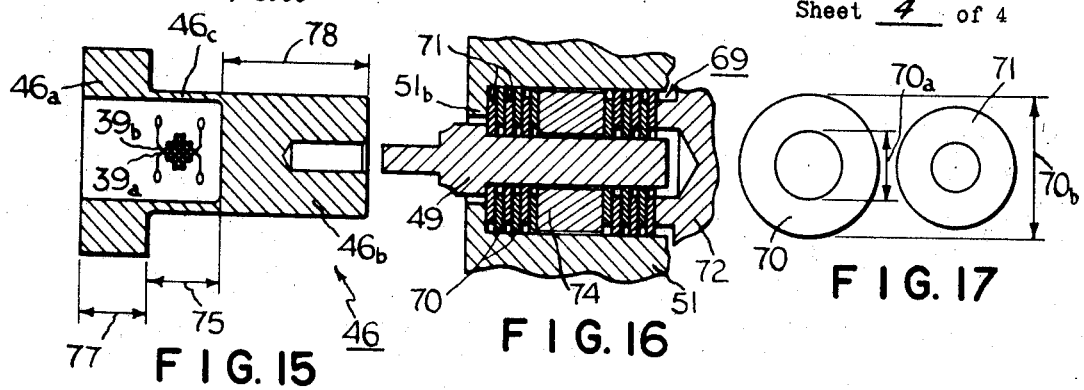
Figure 18:
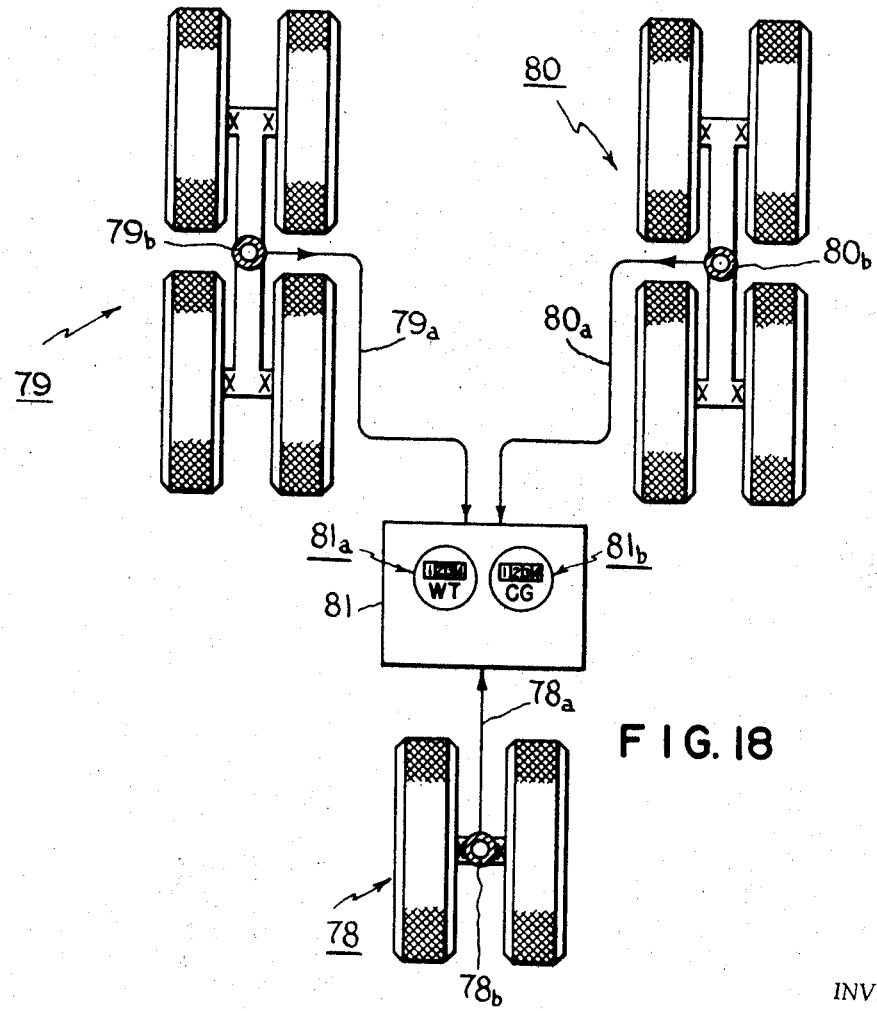

FIGURE 5 schematically illustrates bridge circuit connections for gages such as those of FIGURE 4;

FIGURE 6 provides a cross-section of the same axle-mounted transducer in a condition of substantially pure shear;

FIGURE 7 provides a cross-section of the same transducer undergoing bending;

FIGURE 8 is a pictorial illustration of a preferred embodiment of an improved transducer;

FIGURE 9 comprises a longitudinal cross-section of the transducer of FIGURE 8, together with dashed linework characterizing a surrounding axle;

FIGURE 10 is a view, taken from the right, of the transducer in FIGURE 9;

FIGURE 11 portrays one of the washer-type expansion collet units of the transducer of FIGURES 8–10;

FIGURE 12 is a cross-section of the collet unit of FIGURE 11;

FIGURE 13 portrays an alternative form of expansion collet;

FIGURE 14 is a side view, mainly in cross-section, of separated sections of an axle-mounted transducer;

FIGURE 15 provides a longitudinal cross-section of the shear-sensing element of the transducer of FIGURES 8–10;

FIGURE 16 provides a longitudinal cross-section of part of a support section which avoids unwanted stressing of a shear-sensing element with which it is to cooperate;

FIGURE 17 depicts a pair of dissimilar locking washers which appear in the support section of FIGURE 16; and FIGURE 18 comprises a partly pictorial and schematic diagram of an on-board weight-responsive system into which the improved transducers may be incorporated.

The paired aircraft wheels 19 and 20 appearing in FIGURE 1 represent part of a landing gear unit which bears some of the loading typically shared by three units in the usual tricycle landing gear array. Conventional tubular forms of an axle 21 and strut 22 communicate downward force 23 of the ground-supported aircraft to the wheels and thence to the underlying apron surfaces. Wheel reactions to the vertical loading are characterized by force arrows 24 and 25, and normally are about equal. In addition to the downwardly-directed forces representing the aircraft weight which is of interest for measurement purposes, the wheel reactions can be expected to involve lateral components, such as are designated by arrows 26 and 27, as the unavoidable result of such factors as wind loading, apron slope or irregularities, parking stresses, uneven tire inflations or wear, and the like. Resulting deflections of the halves of axle 21 reflect the effects of both bending moment and shear; bending moments tend to cause the kind of deflections designated by dashed linework 28, and shear deflections tend to be of the nature designated by dashed linework 29. Bending moment varies with position along the longitudinal axis of axle 21, of course, and represents the vertical load multiplied by the distance between that position and the center of pressure of the tire on the underlying apron, plus any lateral loads multiplied by the tire radius. As has already been referred to, the side loads may vary and the radius and center of pressure, or "footprint," of the tire may change also. Bending moment plot 30 shows variations with distance, considering only the vertical load reactions 24 and 25 while they remain constant, and plots 31 and 32 characterize the net bending moments due to the combined effects of these vertical load reactions with the horizontal side loads 26 and 27, respectively. When transducers responsive to bending moments are employed, their axial positions are thus critical, and, moreover, the contributions due to side loadings cannot be segregated and the measurement can be seriously in error if they are taken to represent craft weight. By way of important distinction, however, the shear plot 33 characterizes only the forces in the vertical direction, as desired, and is even essentially independent of the positions along each half of the axle.

Based upon recognitions of the latter advantages, a shear-responsive transducer 34 (FIGURE 2) is disposed within each half of the hollow cylindrical axle 21 to sense and characterize only the shear effects which take place due to weight-related forces acting in the vertical direction. The sensing element includes spaced rigid end portions $35_a$ and $35_b$ and an intermediate relatively thin-walled flexible tubular portion $35_c$, the rigid end portions being separately suspended within the axle by separate annular collects, 36 and 37, which preferably have firm substantially line-contact engagements with the inner axle surface $21_a$ around their outer peripheries. Because of their substantially triangular cross-sectional configurations, the inner peripheries of these annular collets each make secure engagements with the rigid end portions and tend to hold these end portions in fixed relation to the collects. A pair of over-laid resistance-type strain gages is bonded to the interior surface $35_c'$ of the flexible portion $35_c$ at each of two opposite positions along a horizontal diameter of that flexible portion, where they will respond to tension and compression effects exhibited at these positions. As is shown in the shear diagram 38 associated with the illustration in FIGURE 3, the shear distribution in a vertically-loaded thin hollow cylindrical section is high along the horizontal diameter, being about twice the average shear for the section, and gaging therealong results in desirably high responses. Further important advantages result from the fact that this unique form of shear sensor well lends itself to construction as a small lightweight element which does not add significantly to the craft loading, which may be flexible and sensitive enough to develop large responses, and which may be machined simply and accurately. Collaterally, it is important that the preferred collecting, described in detail later herein, need not be adjusted in a manner which would tend to impose forces disturbing the lightweight construction of the sensing element. In FIGURE 4, wherein the cylindrical inner sensor surface $35_c'$ is opened out flat for purposes of illustration, one of the gage units, 39, is shown to include a first-resistance wire grid $39_a$ aligned at about 45° to the longitudinal axis of the sensor, in one direction, and a second grid $39_b$ normal to the first; similarly, the other gage unit 40 includes the mutually-perpendicular grid wires $40_a$ and $40_b$ also at about the same 45° orientations.

One of the two strain-gage bridges in FIGURE 5 is shown to include the aforementioned gages, it being understood that the companion bridge 41 for the adjoining half axle is of course similar. The resistance grid-wires for each half of the pair constituting one of the gage units are connected in adjacent arms of the bridge, and those grid wires which simultaneously go into either tension or compression on opposite sides of the sensor as it experiences shear are disposed in opposite diagonals of the bridge. Considering the pure shear condition depicted in FIGURE 6, for example, the gage wires $39_a$ and the diametrically-opposite gage wires $40_a$ are simultaneously in tension while the remaining wires $39_b$ and $40_b$ are both in compression; hence the bridge output leads 42 yield an electrical output signal characterizing the vertical forces related to weight. Input leads 43 are connected with a power source in the usual manner. If unwanted horizontal forces should thrust the axle halves forward or backward, the gage wires $39_a$ and $39_b$ would both be in tension or compression, while the other gage wires $40_a$ and $40_b$ would be in the opposite state, with the result that there would be no bridge output responsive to those horizontal bending forces, which is highly desirable. Unavoidable vertical bending forces produce distortions of the type portrayed in FIGURE 7; in that case each of the four gage wires is partly in compression and partly in tension, such that there is no related output from either gage or from the aforementioned bridge in which they are connected as arms. Similar advantageous cancellations are effected even if the crossed pairs of wires do not lie precisely along the horizontal axis, and for the undesirable effects of horizontal shear, if any should be present. Torsional and axial elongation effects are likewise self-cancelling.

In a preferred embodiment appearing in FIGURES 8 through 10, an on-board axle-type transducer includes a pair of adjustable radially-expansible annular collets 44 and 45, corresponding to the collets 36 and 37 in FIGURES 2, 3, 6 and 7. However, although the shear-sensing element 46 (FIGURE 9) is at one rigid end portion $46_a$ normally in a sub-assembly 47 with one of the collets, 44, the opposite rigid end portion $46_b$ is axially separable from another sub-assembly 48 normally carrying the other adjustable collet 45. This arrangement facilitates the attachment of the transducer into unstrained locked relationship with the axle. A central pin 49 in sub-assembly 48 fits closely within the illustrated (FIGURE 9) accommodating central opening in sensor end portion $46_b$ to provide needed radial support when the sub-assemblies are joined in use. Rigid end portion $46_a$ of the sensing element is brazed or otherwise rigidly secured in relation to a surrounding collar 50 onto which the first adjustable collet 44 is fitted, and a similar collar 51 secured with the central pin structure of assembly 48 provides a mount for the other collet 45; different sizes of collets may thus readily adapt the transducer to use with various axles. Conveniently, the internal strain gaging of the sensor, one unit of which is illustrated in the form of the double-grid strain gage 39', and corresponding to the gage in FIGURES 2–5, may be hermetically sealed by a cover plate 52 involving glass-to-metal seals for electrical connection leads, and an end housing 53 filled with potting compound (not shown) accommodates a cable connector 54 and such auxiliary items as a resistor 55 and modulus compensation gage 56.

Collets 44 and 45 are of unique lightweight construction which will reliably and securely fasten the transducer in a set position despite irregularities in unfinished inner surfaces of an axle, and despite extremely severe shock, vibration and temperature cycling. Moreover, each of these collets is independently locked in place, in a simple and convenient manner, without undesirably stressing the lightweight sensor element. For these purposes, each collet is fashioned from a pair of essentially annular flexible dished members, placed back-to-back with their concave sides in confronting relationship. Preferably, though not necessarily, the collets are of the same size, and FIGURES 11 and 12 are further views of one of these, 44, showing that the similar flexible dished metal members $44_a$ and $44_b$ are preferably joined together by welding or the like along their circularly-shaped outer peripheral spans 52 and 53. Their remaining peripheral portions, 54 and 55, are preferably of lesser annular width, such that they will not engage the inside walls of the surrounding axle, and the dashed linework 56 in FIGURE 11 aids in discerning and departures from the circular outline of the peripheral spans 52 and 53. The spaced inner peripheries $44_c$ and $44_d$ of the two members $44_a$ and $44_b$ are preferably circular, except for a keyway $44_e$ in one which cooperates with a key element, such as keys 57 and 58 in FIGURE 9, to aid in locking the collet inside an axle with the diametrically-opposite peripheral edges 52 and 53 at the top and bottom. When the transducer is assembled into an axle, as shown in FIGURE 10, the joined circular peripheral portions of the vertically-elongated collets bind at the top 59 and bottom 60 while leaving ample side spaces 61 and 62 for free passage of cabling which commonly must pass through the hollow axle for other purposes. In addition to this advantage, the face that the collets will not bind laterally wtth the axle along their sides desirably serves to reduce sensitivity of the transducer to side loads, which are not of interest, and also decreases the forces needed to cause firm locking between the collets and axle.

In fabricating the collets, it is advantageous to employ metal which is somewhat softer than that of the axle into which it is to be inserted, such that expansion of the collets into biting engagement with the axle will not excessively deform and possibly weaken the latter. The flexible dished halves, such as halves $44_a$ and $44_b$ are conveniently made annular and then subsequently machined to remove material from the side portions which are to be of reduced radial width. Welded outer peripheral edges, such as joined edges 52 and 53, are readily machined to narrow circular form which, importantly, will develop an essentially "line" contact with the interior of the axle when radially expanded from a diameter just slightly less than the inner diameter of the hollow axle. Similarly, the axially-spaced inner peripheral edges of the collets, such as edges $44_c$ and $44_d$, are initially of somewhat larger diameter than the outer diameters of the collars, such as collars 50 and 51, with which they are mated, and axial compression of these edges toward one another will cause them not only to expand the outer peripheries but also to bind with the collars at two spaced positions. The latter conditions are evident in the FIGURE 9 illustration. Each of the joined transducer sub-assemblies 47 and 48 is held rigidly in place along the longitudinal axis of the axle because each of the collars 50 and 51 is supported via a "triangular" suspension including the single outer and two spaced inner lines of contact made by the expanded collets. The fact that mere line contacting is made with the axle interior by the exteriors of the two spaced collets is advantageous in that the axle thus cannot induce localized bending effects at the sites of these two collets.

When collet 44 is unexpanded, the transducer subassembly 47 with which it is associated may be slipped into the axle to a desired axial position, which is generally not critical for reasons already mentioned herein. Inner peripheral edge $44_c$ of the collet abuts a shoulder $50_a$ of collar 50 and thus is axially restrained in one direction; the opposite spaced inner peripheral edge $44_d$ is engaged by a collet nut 63 threaded on collar 50 for axial adjustment therealong, and may be tightened to a predetermined torque in relation to that collar by long-handled tooling until the inner edges are compressed toward one another to cause the collet to expand radially and bind tightly both with the axle and with the collar. Jam nut 64 may then be tightened to insure that the collet setting is preserved. The second sub-assembly, 48, is then inserted, its pin member 49 being mated with the rigid end portion $46_b$ of the sensing element 46, and its collet 45 is then similarly expanded into binding relationships with the axle 21 and collar 51 by adjusting collet nut 65 until the inner peripheries $45_c$ and $45_d$ are adequately compressed between that nut and a collar shoulder $51_a$. A jam nut 66 is also preferably added.

The collet members may be of configurations other than that already discussed herein, such as a substantially annular configuration, or a three-armed configuration like that of the unit 67 in FIGURE 13. Strain gages may also be disposed around the flexible tubular portion of the sensing element as a substantially continuous ring, or in other locations suiting special needs. Although the collets have been illustrated as comprising two flexible dished members of about the same size, the inner diameters may be different for purposes of cooperating with collars having stepped external diameters, and one of the members may be rigid and essentially flat rather than flexible and dished, with the outer peripheries left unjoined so that relative slippage may occur during radical expansions. Essentially line-contact connections may be effected advantageously with collects having discontinuous slotted or toothed exterior peripheries also.

In FIGURE 14, wherein elements of functions corresponding to those of the apparatus of FIGURES 8–10 are correspondingly numbered, the sub-assembly 47 carrying the sensing element 46 is shown to be locked within the axle and the further end-support sub-assembly 48 has not as yet been locked in position via its colleting 45. It is obviously difficult to insure that the support pin member 49 and its receptacle in the end of sensor portion $46_b$ will both lie in accurate alignment along the longitudinal axis 68—68 of the axle, or that the end-support sub-assembly 48 will, when locked in place, tend to be in accurate axial alignment with the already-locked sub-assembly 47. However, the distortions which can be induced in the sensitive portion of sensing element 46 if the support assembly imposes unwanted shear loading can be troublesome particularly in that they may introduce a "zero set" into the transducer and thus require a large external correction. For purposes of avoiding such problems, the support pin structure 49 of sub-assembly 48 is initially permitted to have a certain amount of radial freedom in relation to the surrounding collar 51, by way of an adjustable locking unit 69. As is shown in FIGURES 16 and 17, this unit includes stacked or interleaved annular washers 70 and 71 of different sizes. One set of these, such as washers 70, has both larger inner and outer diameters, $70_a$ and $70_b$, respectively, than the washers 71, and fit closely within collar 51 while remaining sufficiently loose around pin member 49. The remaining washers, 71, fit closely around pin member 49 while remaining sufficiently loose within the accommodating central cylindrical opening in collar 51. When an adjusting nut 72 (FIGURES 16 and 9) is tightened, the interleaved washers are compressed between it and a shoulder $51_b$ on collar 51, thereby causing them to become frictionally locked together and to hold the pin member 49 securely in the radial setting which it occupies relative to the collar 51, despite any lack of precise concentricity. Jam nut 73 guards against loosening. Spacer member 74 permits two small stacks of metal washers to be used in spaced relationship, although one stack may be employed instead. When any desired amount of "zero set," or initial shear biasing of the sensor, is to be introduced, the sliding-washer locking assembly may also serve that purpose. In one preferred practice, for example, the aircraft may be temporarily jacked up with the wheel structure weights causing the axles to deform slightly in shear in direction opposite to normal loading, whereupon the locking washers may then be tightened to frictionally hold the pin member 49 in its then-occupied relationship to collar 51. When the craft is then lowered, each transducer will exhibit an initial mechanical and electrical "set" representing the associated wheel weight, and weight measurements will thereafter advantageously include at least coarse compensations for the weights of the wheels which are not normally supported by the axles and do not add to their deflections.

Sensing element 46 appears separately in FIGURE 15, where the thin-walled flexible shear-sensing portion $46_c$ is shown to have an axial length 75 sufficient to accommodate the internal gaging. The lengths 77 and 78 of its rigid end portions $46_a$ and $46_b$ are adequate to insure that they may be held securely. As is illustrated in FIGURE 9, the locus of gaging is readily made very close to one of the planes of support defined by the line-contacting of one of the collets with the surrounding axle. Although a hollow cylindrical shear-sensing section is preferred and conveniently and economically lends itself to precision manufacture, it should be appreciated that the tubular cross-section may be other than of prefectly circular form, and may for example be elliptical, or may involve a circular opening within a rectangularly-shaped member.

A typical installation is represented in FIGURE 18, wherein an aircraft nosewheel unit 78 and right and left main wheel units 79 and 80 are each equipped with the improved transducers within the axles near each wheel at the sites marked "X." Cabling $78_a$–$80_a$ couples the transducer measurement information through the struts $78_b$–$80_b$ to an on-board instrumentation package 81. The latter provides visual gross weight and center-of-gravity displays $81_a$ and $81_b$ in accordance with known techniques; total weight is determined by adding the weights detected at the sites of each of the wheels, and center-of-gravity is computed by considering the moments of the wheel reactions (longitudinal and/or lateral) in relation to reference positions. Landing and lift-off conditions may be established from the weight signals also, although the conventional measurements are made while the craft is stationary.

The specific embodiments and practices herein described have been presented by way of disclosure rather than limitation, and various modifications, substitutions and combinations may be effected by those skilled in the art without departure in spirit or scope from this invention in its broader aspects and as set forth in the appended claims.

What I claim as new and desire to secure by Letters Patent of the United States is:

1. Transducer apparatus comprising a load sensor having substantially rigid end portions and at least one relatively deformable portion between the joined as a unit with said end portions, first and second collet means for mounting said end portions in relation to a load-supporting member at spaced positions therealong, at least one of said collet means having narrow peripheral edge surfaces which forms a substantially line contact with at least one of the adjoining peripheral surfaces of the load-supporting member and of the sensor end portion between which it is disposed, and gage means for producing electrical output signals characterizing deformations exhibited by the load-supporting member and transferred to said deformable portion of said load sensor via the line contact of said edge surfaces of said collet means.

2. Transducer apparatus as set forth in claim 1 wherein said one of said collet means includes a pair of substantially annular flexible dished members in a confronting relationship wherein one of the peripheries thereof comprises axially-spaced edges of said members supporting one of said rigid end portions and the other of the peripheries thereof comprises a narrow edge for substantially line-contact mounting in relation to the load-supporting member, and further comprising means for axially adjusting the spacing between said axially-spaced edges to change the radial expanses of said peripheries and, thereby, the locking of said collet means with said sensor and the load-supporting member.

3. Transducer apparatus as set forth in claim 1 further including adjustable locking means connecting at least one of said collet means with one of said rigid end portions, said adjustable locking means comprising at least one stack of interleaved washer members of different sizes, each of the different-size washers being proportioned to fit tightly in relation to a different one and loosely in relation to the other of said collet means and one of said end portions, and means for applying force axially along said stack and thereby frictionally locking said washer members together.

4. Transducer apparatus as set forth in claim 1 wherein each of said collet means is substantially annular and includes substantially circular inner and outer peripheral surfaces, wherein said peripheral surfaces of the load-supporting member are substantially cylindrial, and wherein peripheral surfaces of at least one of said end portions are substantially cylindrical.

5. Transducer apparatus as set forth in claim 1 wherein said load sensor is substantially symmetrical about and coaxial with said collet means about a longitudinal axis, wherein said relatively deformable portion of said sensor is hollow, and wherein said gage means comprises electrical strain gages bonded to surfaces of said hollow deformable portion at oppositely-disposed positions lying substantially along an axis normal to said longitudinal axis.

6. Transducer apparatus as set forth in claim 1 wherein said relatively deformable portion of said load sensor is substantially cylindrical and hollow, and wherein said gage means comprises a pair of electrical strain gages bonded to surfaces of said hollow cylindrical portion at each of substantially diametrically opposite positions.

7. Transducer apparatus as set forth in claim 1 wherein said relatively deformable portion is hollow as defined by a recess into said sensor from one rigid end portion thereof, and wherein said gage means comprises electrical strain gages bonded to interior surfaces of said hollow portion, and further comprising means fixed with said one rigid end portion closing and sealing and open end of said recess with said gages inside.

8. Transducer apparatus as set forth in claim 6 wherein the strain gages in each pair are differently aligned to respond to tension and compression effects substantially along mutually perpendicular axes which are each disposed at an angle of substantially 45 degrees relative to the longitudinal axis of said hollow cylinder portion, and further comprising means connecting said strain gages into an electrical bridge circuit relationship wherein the gages in each pair are in adjacent arms of the bridge and wherein the gages aligned in substantially the same directions are in diagonally opposite arms of the bridge, whereby the bridge output characterizes substantially the shear effects on said hollow cylindrical portion as the result of net forces thereon in directions substantially perpendicular both to said longitudinal axis and to direction of said diametrically-opposite positions.

9. Transducer apparatus comprising a load sensor unit having surfaces which exhibit strain responsive to loadings thereof, and collet means for mounting said sensor unit in predetermined fixed relattion to a cooperating member at spaced positions therealong, at least one of said collet means being expansible and including a pair of adjoining collet elements at least one of which is of flexible dished form and of substantially annular outline only over limited angular ranges angularly spaced from one another, with the regions between said ranges being of lesser radial width, and said one of said collet means further including means for axially compressing said elements to enlarge the radial expanse of the flexible element and thereby lock said load sensor unit in relation to said cooperating member.

10. Transducer apparatus as set forth in claim 9 wherein the material of which at least said flexible element is made is softer than the material of the cooperating member with which said flexible element is to be locked when the radial expanse thereof is enlarged.

11. Transducer apparatus as set forth in claim 9 wherein both of said collet elements are of flexible dished metal form and are disposed in an adjoining confronting relationship wherein one of the peripheries thereof comprises axially-spaced edges of said elements and the other periphery thereof comprises a single narrow edge of at least one of said elements.

12. Transducer apparatus comprising a load sensor unit having surfaces which exhibit strain responsive to loadings thereof, and collet means for mounting said sensor unit in predetermined fixed relation to a cooperating member at spaced positions therealong, at least one of said collet means being expansible and including a pair of adjoining collet elements which are both of flexible dished metal form and are of substantially the same size and are disposed in an adjoining confronting relationship wherein one of the peripheries thereof comprises axially-spaced edges of said elements and the other periphery thereof comprises a single narrow edge including a bonded juncture between said elements along said other periphery, and said one of said collet means further including means for axially compressing said elements to enlarge the radial expanse of the flexible elements and thereby lock said load sensor unit in relation to the said cooperating member.

13. Transducer apparatus as set forth in claim 9 wherein said load sensor unit has a substantially cylindrical exterior surface and a nearby externally-threaded surface, wherein said one of said collet means is disposed with said one of said elements in closely-mated surrounding relationship with said cylindrical exterior surface, and further including an adjusting nut threadedly engaged with said threaded surface and disposed to apply forces to said one of said collet means near the inner periphery thereof tending to compress said elements axially and thereby enlarge the radial expense of said flexible element.

14. Transducer apparatus comprising a load sensor unit having surfaces which exhibit strain responsive to loadings thereof and wherein said load sensor unit has a substantially cylindrical exterior surface and a nearby externally-threaded surface, collet means for mounting said sensor unit in predetermined fixed relation to a cooperating member at spaced positions therealong, at least one of said collet means being expansible and including a pair of adjoining collet elements of flexible dished metal form of substantially the same size with their concave sides in confronting relationship and with their inner peripheral edges axially spaced from one another and with their outer peripheral portions secured together, said one of said collet means being disposed in closely-mated surrounding relationship with said cylindrical exterior surface, and an adjusting nut threadedly engaged with said threaded surface and disposed to apply forces to said one of said collet means near the inner periphery thereof tending to compress said elements axially and thereby enlarge the radial expanse of said flexible element.

15. Transducer apparatus as set forth in claim 14 wherein said collet means are of substantially the same construction and wherein said load sensor unit includes a substantially cylindrical exterior surface and a nearby externally-threaded surface and an adjusting nut engaged with the threaded surface for each of said collet means.

16. Transducer apparatus as set forth in claim 15 wherein the collet elements of each of said collet means are welded together along diametrically-opposite portions thereof and are of reduced radial width between said portions, and further comprising keying means angularly locking said collet means with said load sensor unit in substantially the same angular orientation.

17. Transducer apparatus as set forth in claim 16 wherein said load sensor unit includes a load-sensing device having relatively rigid end portions and at least one relatively deformable tubular portion therebetween on the interior surfaces of which said strain is exhibited, and electrical strain gages bonded with said interior surfaces at predetermined positions, and wherein said load sensor unit further includes support means axially connectable with and detachable from one of said rigid end portions, said support means being surrounded by one of said collet means and including a substantially cylindrical exterior surface and a nearby externally-threaded surface and an adjusting nut engaged with the threaded surface.

18. Transducer apparatus comprising a load sensing device including end portions and a substantially tubular portion of substantially annular cross-section between and joined as a unit with said end portions which exhibits surface strains responsive to loadings thereof, means for applying loading forces to said end portions of said load sensing device in directions substantially normal to the longitudinal axis of said tubular portion, and electrical strain gage means including at least one pair of electrical strain gages bonded to interior surfaces of said tubular portion at each of two positions displaced substantially 180 degrees apart around said axis and responding to load-induced strains thereof.

19. Transducer apparatus as set forth in claim 18 wherein said means for applying load forces to said end portions includes a pair of collets surrounding and in spaced relation along said longitudinal axis, said collets each being adjustable to clamp said load sensing device in relation to a substantially cylindrical surface concentric with said axis.

20. Transducer apparatus as set forth in claim 19 wherein said collets are radially expansible and extend radially outwardly beyond said load sensing device, said collets being of greater expanse along one diameter than along a diameter transversely thereto and being fixed in relation to said load sensing device with said one diameter oriented transversely in relation to the direction of said two strain gage positions.

21. Transducer apparatus as set forth in claim 20 wherein said gages in each pair are disposed to respond to strains in tension and compression along mutually perpendicular axes which are both at angles of substantially 45 degrees in relation to said longitudinal axis, and means connecting said strain gages into an electrical bridge relationship wherein the gages in each pair are in adjacent arms and wherein substantially parallel gages in the respective pairs of gages are in opposite arms, whereby the bridge output of the connected gages characterizes substantially only shear forces applied to said load sensing device along said one diameter of each of said collets.

22. Transducer apparatus comprising a load sensing device including end portions and a substantially tubular portion between said end portions which exhibits surface strains responsive to loadings thereof, means for applying load forces to said end portions of said load sensing device in directions substantially normal to the longitudinal axis of said tubular portion, electrical strain gage means bonded to said tubular portion and responding to load-induced surface strains thereof, and means closing and sealing said tubular portion of said load sensing device with said strain gage means inside said tubular portion.

23. Transducer apparatus as set forth in claim 19 wherein said means for applying forces to said end portions includes support means having connection means connectable and detachable from one of said rigid end portions, one of said collets being in surrounding relation to said support means, and said support means including adjustable locking means connecting said one of said collets with said connection means, said adjustable locking means including at least one axially-compressible stack of interleaved washer members of different sizes, each of the different-size washers being proportioned to fit tightly in relation to a different one and loosely in relation to the other of said connection means and said one of said collets.

24. Transducer apparatus comprising a load sensor including end portions and a load-responsive portion between and joined with said end portions, means for mounting each of said end portions in relation to a surrounding member, at least of said mounting means including adjustable locking means for connecting one of said end portions with the surrounding member, said adjustable locking means comprising at least one coaxial stack of interleaved washer members of different sizes, alternate ones of said different-size washers being proportioned to fit tightly in relation to a different one and loosely in relation to the other of said one of said end portions and the surrounding member, and means for applying force axially along said stack and thereby frictionally locking said washers together to lock said one of said end portions in a predetermined relation to the surrounding member.

25. Transducer apparatus comprising a load sensor including relatively rigid end portions and a relatively deformable hollow cylindrical portion therebetween formed by a substantially cylindrical recess into said sensor from one of said ends thereof, a first collar fixed in surrounding relation to said one of said rigid ends and having an external shoulder and external threading with a substantially cylindrical mounting portion therebetween, a support member separably mated with the other of said rigid ends of said sensor, a second collar in surrounding relation to said support member and having an external shoulder and external threading with a substantially cylindrical mounting portion therebetween, means for securing said second collar in surrounding relation to said support member, a pair of radially expandable collet means each in surrounding relation to a different one of the cylindrical mounting portions of said collars, each of said collets including a pair of flexible dished metal washer members with their concave sides in a confronting relationship wherein their outer edges are engaged and their inner edges are axially spaced, each of said collars further including a nut threadedly engaged with the external threading thereof and rotatable to compress said inner edges of the associated collet members axially between the shoulder and nut of said collar and, thereby, to expand said collet radially, and electrical strain gage means surface-bonded with the interior of said hollow cylindrical portion of said load sensor.

26. Transducer apparatus as set forth in claim 25 wherein the metal washer members of each of said collets are welded together at their outer edges to form a single narrow edge for substantially line-contact engagement with a surrounding hollow axle member.

27. Transducer apparatus as set forth in claim 26 wherein the metal of which said washer members are made is softer than the metal of said surrounding hollow axle member with which the collet is engageable upon expansion.

28. Transducer apparatus as set forth in claim 26 wherein said collet members are substantially circular about their inner edges and about limited diametrically-opposite arcuate spans of their outer edges, said collet members being of reduced radial width between said spans, and further including keying means preserving said diametrically-opposite spans of said collets in alignment about the longitudinal axis of said cylindrical portion.

29. Transducer apparatus as set forth in claim 28 wherein said strain gage means comprises a pair of electrical strain gages at each of two diametrically-opposite positions along the interior of said cylindrical portion.

30. Transducer apparatus as set forth in claim 29 wherein said positions are angularly aligned about said axis substantially normal to the relationship of said diametrically-opposite spans of said collets to said axis, and wherein the strain gages of each of said pair are in a substantially mutually perpendicular relationship and at angles of about 45 degrees to said axis.

References Cited

UNITED STATES PATENTS

| 2,873,341 | 2/1959 | Kutsay | 338—6 |
| 3,327,270 | 6/1967 | Garrison | 338—2 |
| 3,037,178 | 5/1962 | Pien | 338—5 |

OTHER REFERENCES

Strainsert, 24 Summit Grove Ave., Bryn Mawr, Penn., 19010, Brochure, #361-4.

RICHARD C. QUEISSER, *Primary Examiner.*

VICTOR J. TOTH, *Assistant Examiner.*

U.S. Cl. X.R.

73—65; 177—136; 338—5